Feb. 29, 1944.  G. A. LOCHHEAD  2,342,741
VARIABLE SPEED TRANSMISSION
Filed March 23, 1943  2 Sheets-Sheet 1

Inventor

George A. Lochhead

By Clarence A. O'Brien
and Harvey B. Jacobson
Attorneys

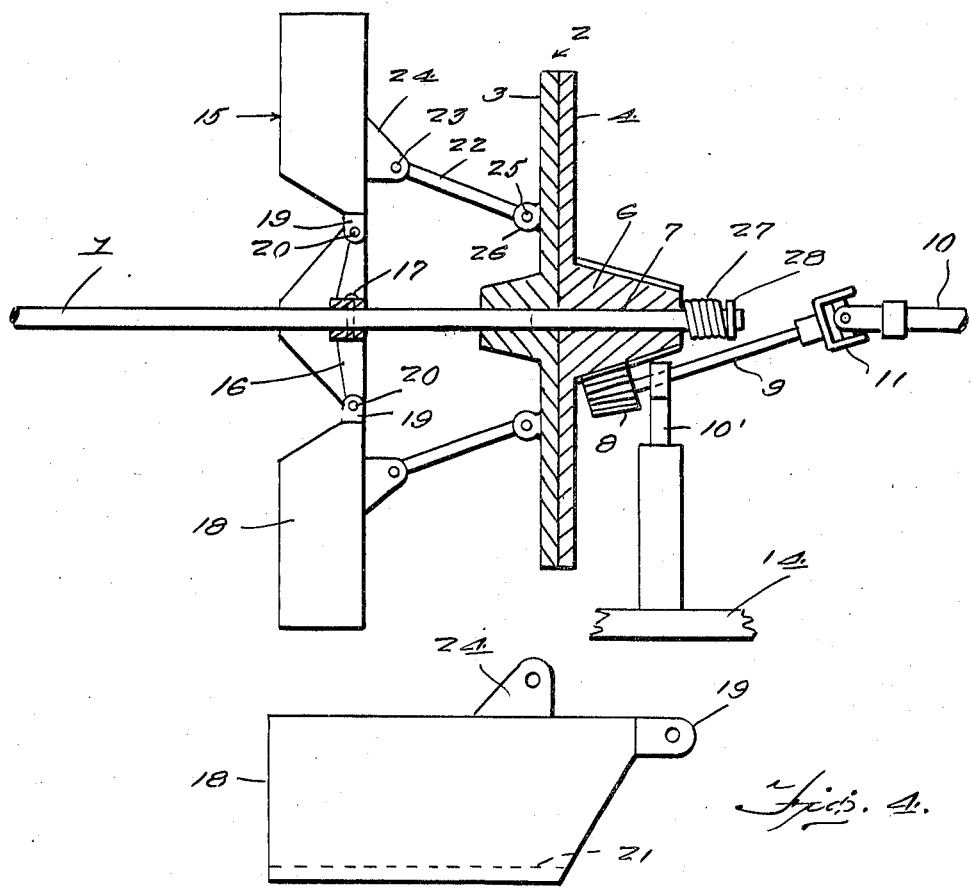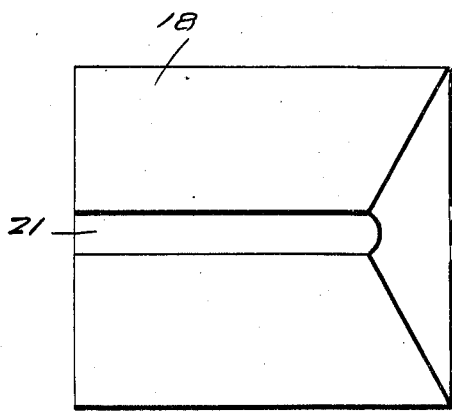

Patented Feb. 29, 1944

2,342,741

UNITED STATES PATENT OFFICE 2,342,741

VARIABLE SPEED TRANSMISSION

George A. Lochhead, Tekamah, Nebr.

Application March 23, 1943, Serial No. 480,211

1 Claim. (Cl. 192—3.5)

My invention relates to improvements in variable speed transmissions for use, more particularly, although not necessarily, in the line of connection between the motor and drive shaft of automobile power plants.

The invention is designed with the primary object in view of providing a simply constructed, efficient, variable speed transmission adapted for automatic operation to accelerate the speed of rotation of the drive shaft of an automobile in gradually increasing ratio relative to the increase in the speed of rotation of the crank, or motor, shaft of the power plant, and without shock, or jar, or utilizing different gear shifts such as are commonly used, for different speeds.

Another object is to provide a variable speed transmission for the purposes above set forth and which is economical to manufacture, involves few parts, and requires a minimum of servicing.

Other and subordinate objects are also comprehended by my invention, all of which, together with the precise nature of my improvements, will be readily understood when the succeeding description and claims are read with reference to the drawings accompanying and forming part of this specification.

Figure 1:
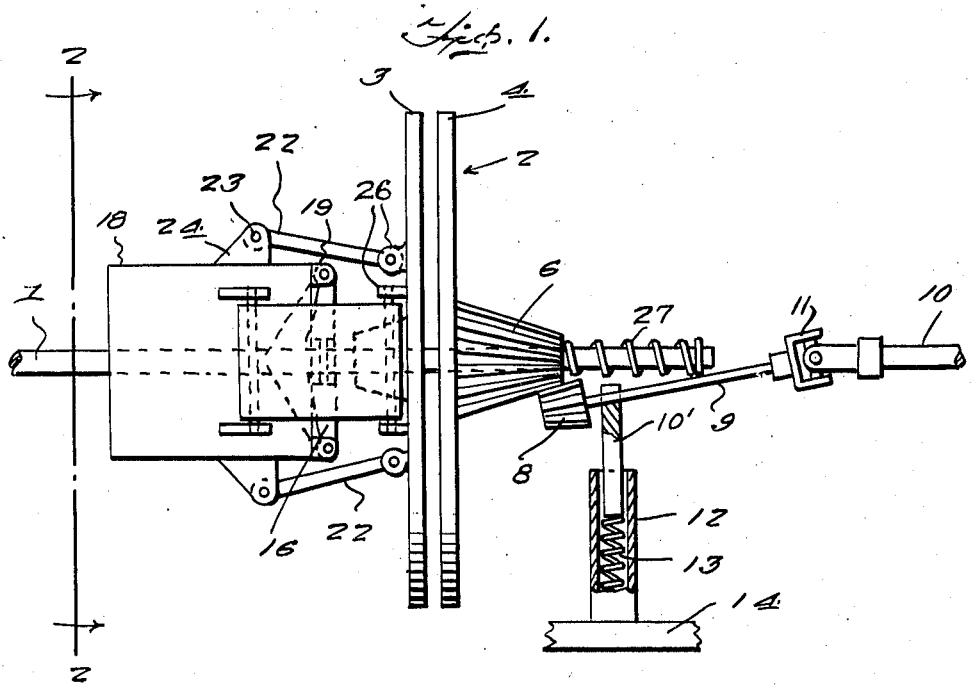
Figure 2:
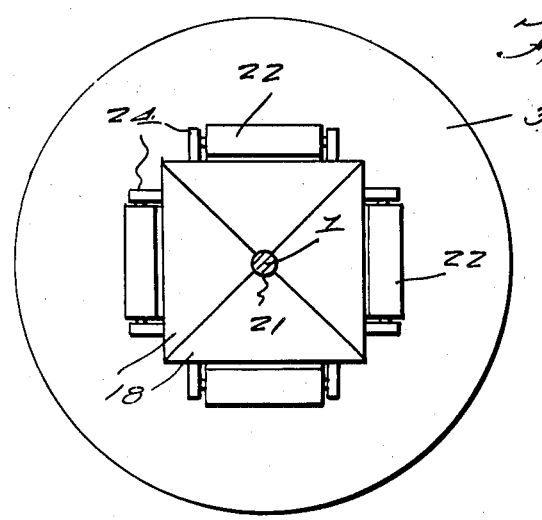

In said drawings:

Figure 1 is a view in plan of my improved variable speed transmission in its preferred embodiment and with parts shown in section, Figure 2 is a view in transverse section taken on the line 2—2 of Figure 1, Figure 3 is a view similar to Figure 1 illustrating the operation of the invention, Figure 4 is a view in side elevation of one of the weights of the centrifugal throw governor, and Figure 5 is a view in plan of said weight.

Referring to the drawings by numerals, according to my invention, in its preferred embodiment, the crank, or motor, shaft 1 of an automobile power plant, not shown, is equipped with a friction clutch, designated 2, including a pair of driving and driven clutch disks 3, 4, the driving disk 3 being laterally movable on the crankshaft 1 in opposite directions into and from frictional engagement, respectively, with the driven disk 4, and the driven disk 4 being freely rotatable about the crankshaft 1 and laterally movable thereon in opposite directions to accelerate and decelerate, respectively, the speed of rotation of the driven shaft 10 of the automobile through the medium of means now to be described.

Fast on the driven disk 4, in the axis thereof, and preferably integral therewith is an elongated gear 6 axially bored, as at 7, for rotary and sliding movement on said shaft 1 and which tapers from said disk 4. The driving gear 6 meshes with a relatively smaller driven gear 8 tapered oppositely, relative to the taper of the driving gear 6, and which is fast on one end of a motion transmitting shaft 9 inclining toward the front end of the driven shaft 10 of the power plant and operatively connected at its opposite end to said shaft 10 by a universal joint 11, for a purpose presently apparent. The driven gear 8 is yieldingly urged toward the driving gear 6 in meshing engagement therewith by means of a bearing arm 10' in one end of which said shaft 9 is journaled adjacent the driving gear 6, the other end of said arm being slidably mounted in a fixed tubular support 12 and spring pressed, as at 13, toward the axis of the driving gear 6. The support 12 may be fixed in any suitable manner, for instance to the chassis, and as represented at 14.

A centrifugal throw governor 15 forms an operating connection between the crankshaft 1 and the driving disk 3 and functions to move the disk 3 in a direction to frictionally engage the same with the driven disk 4.

The centrifugal throw governor 15 comprises a cruciform spider 16 fixed to the crankshaft 1, as by a pin 17, and substantially rectangular weights 18 pivotally connected to said spider 16 in 90 degree angular relation to swing outwardly under the action of centrifugal force and fold inwardly about said shaft 1 into idle position. The pivotal connection for each weight 18 comprises a pair of lugs 19 on one end of the weight 18 and a pivot pin 20 securing the lugs to said spider 16. The weights 18 are triangular transversely to fold inwardly along the crankshaft 1 in side-by-side relation and are longitudinally grooved, as at 21, to fit around said shaft so as to interfit closely when folded. Operating connections are provided between each weight 18 and the driving disk 3 comprising, in each instance, a flat rectangular plate 22 having one end suitably pivoted, as by side trunnions 23, on the plate, to a pair of ears 24 on one face of the corresponding weight 18 and its other end similarly pivoted, by trunnions 25, to a pair of ears 26 on one face of the driving disk 3.

A coil spring 27 sleeves onto the crankshaft 1 between the gear 6 and a collar 28 on said shaft tensions the disk 4 against movement from a normal position in a direction to accelerate the speed of rotation of the drive shaft 10. The normal position of the driven disk 4 is established in a manner presently seen.

The operation of my invention will be readily understood. In the normal, lateral position of the driven disk 4 on the crankshaft 1, the smaller end of the gear 6 is meshed with the driven gear 8, and in the folded position of the weights 18 and normal position of other governor parts, the driving disk 3 is spaced slightly from the driven disk 4 so that the transmission is idle as regards transmitting drive to the driven shaft 10. As rotation of the crankshaft 1 is initiated, the weights 18 start throwing outwardly, thereby imparting end thrust to the plates 22 which thereby moves the driving disk 3 into engagement with the driven disk 4 and whereby the driven shaft 10 is rotated at slow speed by the small end of the driving gear 6, the gear 8, and the motion transmitting shaft 9. As the speed of rotation of the crankshaft 1 increases, the outward throw of the weights 18 increases so that the consequent further endwise movement of the plates 22, and lateral movement of the driving disk 3 moves the driven disk 4 along the shaft 1 and the driving gear along the gear 8 to progressively enmesh the larger diameter portions of said gear 6 with said gear 8, thereby increasing the ratio of drive between said gears 6 and 8 and correspondingly accelerating the speed of rotation of the driven shaft 10 relative to the speed of rotation of the crankshaft 1. During shifting of the driving gear 6 along the driven gear 8, the bearing arm 10' moves into the support 12, in opposition to the spring 13, to permit the required compensating movement of the gear 7 laterally of the driven gear 6. The manner in which deceleration of the drive shaft 10 is effected under deceleration of the crankshaft 1 will be clear from the foregoing description of operations.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A transmission interposed in the line of connection between a drive shaft and a driven shaft comprising an elongated tapered gear mounted on said drive shaft for adjustment thereon in opposite directions, respectively, spring means urging said gear in one direction, means operatively connecting the tapered gear to the driven shaft including a bevel gear constantly meshing with said tapered gear, and means to adjust said tapered gear in the opposite direction in different degree and to simultaneously connect the same to the drive shaft, the second-mentioned means further including an inclined motion-transmitting shaft having said bevel gear fast on one end thereof and its other end universally connected to the driven shaft, said motion-transmitting shaft being spring-urged toward said bevel gear.

GEORGE A. LOCHHEAD.